United States Patent [19]

Boudet et al.

[11] Patent Number: 4,573,903
[45] Date of Patent: Mar. 4, 1986

[54] OPTICAL COMPONENT MOLDING APPARATUS FOR FOLLOWING THE DIFFERENTIAL SHRINKAGE OF MOLDED SYNTHETIC MATERIAL

[75] Inventors: Jean Boudet, Bressey sur Tille; Guy Rolland, Vincennes, both of France

[73] Assignee: Essilor International Cie Generale d'Optique, Paris, France

[21] Appl. No.: 513,998

[22] Filed: Jul. 15, 1983

[30] Foreign Application Priority Data

Jul. 16, 1982 [FR] France .................... 82 12479

[51] Int. Cl.[4] .............................................. B29D 11/00
[52] U.S. Cl. ...................... 425/555; 264/2.2; 425/411; 425/808
[58] Field of Search ............... 264/2.2, 1.7, 1.8, 1.1, 264/2.3; 425/808, 385, 406, 394, DIG. 44, DIG. 124, DIG. 244, 555, 411; 249/112, 114, 115

[56] References Cited

U.S. PATENT DOCUMENTS

| 2,253,697 | 8/1941 | Genesy | 249/114 R |
| 2,333,131 | 11/1943 | Tillyer et al. | 264/2.2 |
| 2,443,826 | 6/1948 | Johnson | 425/808 |
| 2,478,165 | 8/1949 | Collins | 425/388 |
| 2,869,179 | 1/1959 | Van Hartesveldt | 425/398 |
| 3,945,790 | 3/1976 | Puech | 425/385 |
| 4,231,730 | 11/1980 | Birt | 425/385 |
| 4,402,659 | 9/1983 | Greenbaum | 425/808 |
| 4,474,355 | 10/1984 | Greshes | 425/808 |

FOREIGN PATENT DOCUMENTS

| 185163 | 5/1907 | Fed. Rep. of Germany . |
| 2101317 | 7/1972 | Fed. Rep. of Germany . |
| 984000 | 6/1951 | France . |
| 1025217 | 4/1953 | France . |
| 1278497 | 10/1961 | France . |
| 2369072 | 5/1978 | France . |
| 2472765 | 7/1981 | France . |
| 417726 | 10/1934 | United Kingdom . |
| 916377 | 1/1963 | United Kingdom .................. 264/2.2 |

Primary Examiner—Jay H. Woo
Assistant Examiner—J. Fortenberry
Attorney, Agent, or Firm—Charles E. Brown; Charles A. Brown

[57] ABSTRACT

A device suitable for molding ophthalmic lenses comprises two spaced mold parts in face-to-face relationship inside a cylindrical sleeve. One or both parts comprise a rigid supporting base, a molding die of an elastically deformable material and an intermediate pad of an incompressible elastic material disposed between the base and the die and completely covering their respective surfaces.

20 Claims, 2 Drawing Figures

OPTICAL COMPONENT MOLDING APPARATUS FOR FOLLOWING THE DIFFERENTIAL SHRINKAGE OF MOLDED SYNTHETIC MATERIAL

BACKGROUND OF THE INVENTION

1. Field of the Invention

The present invention generally concerns the molding of articles from synthetic material subject to shrinkage of setting and is more particularly directed to the molding of optical components, such as ophthalmic lenses, for example, from a synthetic material of this kind.

2. Description of the Prior Art

As is shown, ophthalmic lenses may be molded from polycarbonate, for example, the shrinkage of which on setting is of the order of 1% by volume; lenses may also be molded from 2-allyl carbonate of glycol diethylene, better known under the trade designation "CR-39", the volume shrinkage of which on setting is of the order of 14 to 15%, much higher than the previous figure.

Generally speaking, the molding device usually utilized to mold ophthalmic lenses comprises two spaced mold parts in face-to-face relationship.

The mold parts utilized may be held spaced from one another by a spacing annular seal at their perimeter, for example, and each may consist of a dished member of tempered glass, this being a material capable of providing an optically perfect surface finish essential to achieving the required finish on the ophthalmic lens to be molded and which, while being rigid, offers sufficient elasticity to permit the mold parts to "follow" the shrinkage of the synthetic material contained between them as it sets.

However, in the case of molding ophthalmic lenses, the thickness of the synthetic material between the mold parts utilized is not the same at all points: it is greater at the perimeter than at the center in the case of a divergent ophthalmic lens and it is greater at the center than at the perimeter in the case of a convergent ophthalmic lens.

The result is differential linear shrinkage in the molded ophthalmic lens, parallel to its axis, that is to say linear shrinkage which is not the same at all points since it is proportional to the thickness.

Because of such differential shrinkage during molding, ophthalmic lenses of synthetic material are usually subject to stresses which may render them fragile and which can be prejudicial to certain treatments applied to them, such as a coloring treatment, for example.

French Pat. No. 1 278 497 proposes a molding device in which each of the mold part comprises, in combination, a rigid supporting base and a rigid molding die of an elastically deformable material, said molding die being separated from said base so as to be able to follow the molded material as it shrinks.

An arrangement of this kind complicates the manipulation of the mold parts, as they are no longer of unitary construction, and in practice calls for the use of a guide at the perimeter of the molding dies. Nor is it able to ensure an even distribution of the pressure at all points on the molding dies.

This may still result in significant tensile stresses in the ophthalmic lenses concerned.

A general object of the present invention is to provide a molding device with which this disadvantage may be overcome and which can offer further advantages.

SUMMARY OF THE INVENTION

The invention consists in a device suitable for molding optical components such as ophthalmic lenses, comprising two spaced mold parts in face-to-face relationship and at least one of which comprises a rigid supporting base, a molding die of an elastically deformable material and an intermediate pad of an incompressible elastic material disposed between said base and said die and completely covering the respective surfaces thereof.

In practice, these mold parts are disposed within a cylindrical sleeve which surrounds them and which laterally closes the molding cavity defined between their molding dies.

After this molding cavity is filled with a measured quantity of molten synthetic material, pressure is applied to the mold parts so as to urge them towards one another.

The intermediate pad of an incompressible elastic material which at least one of the mold parts, and in practical both mold parts, comprises in accordance with the invention, then, and advantageously, brings about even distribution of the pressure at all points on the mold parts, by hydrostatic means, irrespective of any deformation to which the molding dies of the mold parts are subjected as they follow the differential linear shrinkage to which the molded synthetic material is subject on setting.

The result is an advantageous decrease in the tensile stresses in the ophthalmic lens obtained due to the molding process.

French Patent Application No. 2 472 765 filed on Nov. 8, 1979 under Application No. 79 27529 discloses the use of annular seals of an elastic material between rigid mold parts of an elastically deformable material and rigid backing members for same.

However, apart from the fact that in the corresponding molding device the mold parts themselves form the molding dies defining the molding cavity and are backed only annularly by the associated backing members, the elastic material seals disposed between the mold parts and these backing members themselves extend only annularly, and are thus not capable of providing by hydrostatic means equal distribution of pressure at all points on the mold parts.

In the molding device in question, there is, moreover, no question of any pressure distribution, the molding device in practice operating at normal pressure and the elastic material seals utilized between the mold parts and the associated backing members being in reality provided only to avoid direct contact between these backing members and the mold parts.

This is not the case in the molding device in accordance with the invention in which, to the contrary, the pad of incompressible elastic material disposed between a supporting base and a molding die extends over all points thereof, for hydrostatic distribution of the applied pressure.

In addition to this hydrostatic distribution of pressure, the intermediate pad utilized in accordance with the invention offers the advantage of slowing down the rate at which the molded synthetic material cools, thus favoring the obtaining the good optical quality in the resulting ophthalmic lens.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
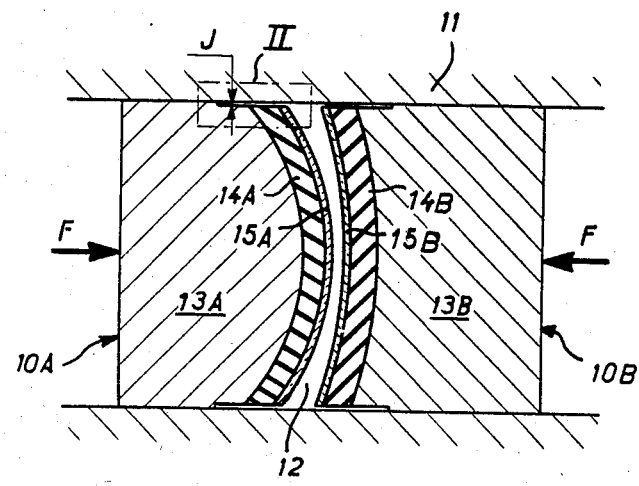
FIG. 1 is a view in axial cross-section of a molding device in accordance with the invention.
Figure 2:
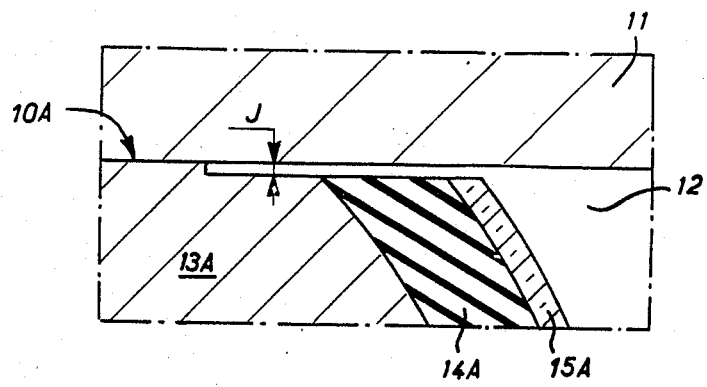
FIG. 2 shows that part of FIG. 1 marked II to a larger scale.

As shown in these figures, the molding device in accordance with the invention comprises, in a manner known per se, for the purpose of molding an ophthalmic lens, two mold parts 10A, 10B spaced from and in face-to-face relationship to one another within a cylindrical sleeve 11 which surrounds them.

A molding cavity 12, the configuration of which conforms to that of the ophthalmic lens, is defined between mold parts 10A, 10B.

In this instance, it is a divergent ophthalmic lens.

As the construction of cylindrical sleeve 11 is well known per se and does not form part of the present invention, it will not be described in detail here. The same applies with regard to the means used to apply to mold parts 10A, 10B pressure so as to bring them towards one another, as shown by arrows F in FIG. 1, in order to pressurize molding cavity 12.

It is sufficient to indicate that, by virtue of an inlet passage not shown in the figures, it is possible to introduce into molding cavity 12 a measured quantity of synthetic material and that, after setting of the latter, it is possible to remove the resulting ophthalmic lens from the mold.

In accordance with the invention, at least one of mold parts 10A, 10B (in the example shown, both) comprises, in combination, a rigid supporting base 13A, 13B, an intermediate pad 14A, 14B of an incompressible elastic material and, defining molding cavity 12, a rigid molding die 15A, 15B of elastically deformable material.

Supporting bases 13A, 13B are of metal, for example. In particular, they may be of steel.

Intermediate pads 14A, 14B are of silicone elastomer, for example.

Preferably, and as shown, they are of the same thickness of all points between supporting bases 13A, 13B and molding dies 15A, 15B which they link together.

They are preferably attached, bonded for example, to supporting bases 13A, 13B and to molding dies 15A, 15B, the attachment forces being sufficiently strong to resist any detaching force.

Molding dies 15A, 15B are of mineral glass, for example.

Alternately, they may be of metal, for example.

In any event, they are also preferably of the same thickness at all points, this thickness being sufficiently small to obtain the required elasticity but sufficiently large to obtain the required rigidity.

Thicknesses of between 0.1 and 10 mm are suitable, for example, it being understood that these values are in no way a limitation on the scope of the present invention.

In any event, the thickness of molding dies 15A, 15B is preferably a sub-multiple of that of intermediate pads 14A, 14B.

Mold parts 10A, 10B obtained in this way have a generally circular contour complementary to that of sleeve 11, in which they are slidably mounted.

However, for preference and as shown, slight annular clearance J is provided between cylindrical sleeve 11 on the one hand and molding dies 15A, 15B and intermediate pads 14A, 14B (and possibly, and as shown, at least part of supporting bases 13A, 13B) on the other hand.

In practice, this clearance J is sufficiently small, given the viscosity of the synthetic molding material, for this material to be prevented from penetrating into the corresponding annular space.

In a first stage of use of the molding device in accordance with the invention, it it closed and its molding cavity 12 filled with a measured quantity of molten synthetic material; molding dies 15A, 15B are then simply supported on their respective supporting bases 13A, 13B through intermediate pads 14A, 14B which are at this time still of the same thickness at all points.

In a second stage, beginning as soon as filling is completed, pressure is applied to supporting bases 13A, 13B as shown by the arrows F in FIG. 1.

Intermediate pads 14A, 14B are then compressed and, given the very small local displacements required of molding dies 15A, 15B to follow the linear shrinkage to which the synthetic material between them is subject on setting, they distribute in a highly hydrostatic manner the pressure between molding dies 15A, 15B, as the synthetic material solidifies; the clearance J provided in accordance with the invention offers the advantage of avoiding any contact between pads 14A, 14B and sleeve 11, so protecting the silicone elastomer of which they are constituted. It has also been found that the tempered glass/silicone elastomer combination used in the mold parts in accordance with the invention in contact with the molded synthetic material is highly favorable to an advantageous decrease in the rate of cooling of the material.

There is no departure from the scope of the present invention in further providing cylindrical sleeve 11 with means (for example, heating means in line with molding cavity 12) adapted to avoid excessively fast setting of the edge of the molded ophthalmic lens, especially in the case of a highly divergent ophthalmic lens having a thick edge, setting of which should preferably occur only after compensation for the shrinkage of the body of the molded material.

It will be understood that various changes in the details, materials and arrangements of parts, which have been herein described and illustrated in order to explain the nature of the invention, may be made by those skilled in the art within the principle and scope of the invention as expressed in the appended claims.

For example, one only of the mold parts utilized may comprise, as described, a supporting base, an intermediate pad and a molding die, the other mold part being of unitary construction, in the usual manner.

When one only of the mold parts thus comprises, in accordance with the invention, a supporting base, an intermediate pad and a molding die, it is preferably the mold part incorporating the less curved molding die.

In the embodiment shown, this would be mold part 10B, molding die 15B of which is concave.

It is claimed:

1. A device suitable for molding synthetic molding material into optical components, said device comprising two spaced mold parts disposed in face-to-face relationship and defining a mold cavity for an optical component; at least one of said mold parts including a rigid supporting base, a molding die elastically deformable in the course of molding a component, and an intermediate pad of an incompressible elastic material disposed between said base and said molding die and completely covering the respective surfaces thereof; said pad being of a thickness and elasticity to form means for effecting movement of said molding die to follow differential shrinkage of molded synthetic material in the course of setting of said molded synthetic material.

2. A device according to claim 1, wherein said pad is of the same thickness at all points between said base and said molding die.

3. A device according to claim 1, wherein said pad is selectively attached to at least one of said base and said molding die.

4. A device according to claim 1, wherein said pad is selectively bonded to at least one of said base and said molding die.

5. A device according to claim 1, further comprising a cylindrical sleeve surrounding said mold parts with three being an annular clearance between said cylindrical sleeve and said molding die and said pad.

6. A device according to claim 5, wherein there is also annular clearance between said sleeve and at least part of said base.

7. A device according to claim 1, wherein said molding die is formed of tempered glass.

8. A device according to claim 1 wherein said one mold part has relatively less curvature than the other of said mold parts.

9. A device according to claim 1, wherein the other of said mold parts also has a base, a molding die and a pad similar to said base, molding die and pad of said one mold part.

10. A device according to claim 9, wherein said molding dies are both thin-walled.

11. A device according to claim 10, wherein said molding dies are of substantially constant thickness throughout.

12. A device according to claim 9, wherein said molding dies each has a thickness of less than 10 mm.

13. A device according to claim 9, wherein said molding dies are of substantially constant thickness throughout.

14. A device according to claim 9, further comprising a cylindrical sleeve surrounding said mold parts with there being an annular clearance between said sleeve and each of said molding dies and said pads.

15. A device according to claim 14, wherein there is also annular clearance between said cylindrical sleeve and at least part of each of said bases.

16. A device according to claim 1, wherein said molding die is thin-walled.

17. A device according to claim 16, wherein said molding die is of substantially constant thickness throughout.

18. A device according to claim 1, wherein said molding die has a wall thickness of less than 10 mm.

19. A device according to claim 1 wherein said molding die is of substantially constant thickness throughout.

20. A device according to claim 1 wherein said molding die is thin-walled, of a substantially constant thickness throughout, and of a thickness less than the thickness of said pad.

* * * * *